(12) United States Patent
Coleman et al.

(10) Patent No.: US 6,231,415 B1
(45) Date of Patent: May 15, 2001

(54) PAGER POPPER

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 09/414,595

(22) Filed: Oct. 8, 1999

(51) Int. Cl.[7] .................................................. A63H 33/30
(52) U.S. Cl. ................................................ 446/76; 446/81
(58) Field of Search ................................ 446/76, 81, 73; 362/109

(56) References Cited

U.S. PATENT DOCUMENTS

| | | | |
|---|---|---|---|
| 4,920,352 | * | 4/1990 | Martensson et al. ............ 343/702 |
| 4,973,285 | * | 11/1990 | Diotte ............................... 446/142 |
| 5,335,367 | * | 8/1994 | Adachi et al. .................... 343/702 |
| 5,471,373 | * | 11/1995 | Coleman et al. ................. 362/109 |
| 5,640,689 | * | 6/1997 | Rossi ................................. 455/89 |
| 5,681,200 | * | 10/1997 | Schecter ............................. 446/76 |
| 5,733,033 | * | 3/1998 | Coleman et al. ................. 362/109 |
| 5,820,437 | * | 10/1998 | Coleman et al. ................. 446/196 |
| 5,855,500 | * | 1/1999 | Coleman et al. ................... 446/81 |
| 5,983,119 | * | 11/1999 | Martin et al. ..................... 455/575 |

FOREIGN PATENT DOCUMENTS 6-303180 * 10/1994 (JP) .

* cited by examiner

*Primary Examiner*—Kent T. Nguyen
(74) *Attorney, Agent, or Firm*—Melvin L. Crane

(57) ABSTRACT

A play pager combined with a lollipop which combines candy with pager sounds. The pager includes an integrated circuit programmed to produce different pager sounds as different switches are closed. An amplifier amplifies the signals and a speaker produces the sounds. A lollipop holder is provided for raising the lollipop to an up position from a down position and from a down position to an up position.

4 Claims, 2 Drawing Sheets

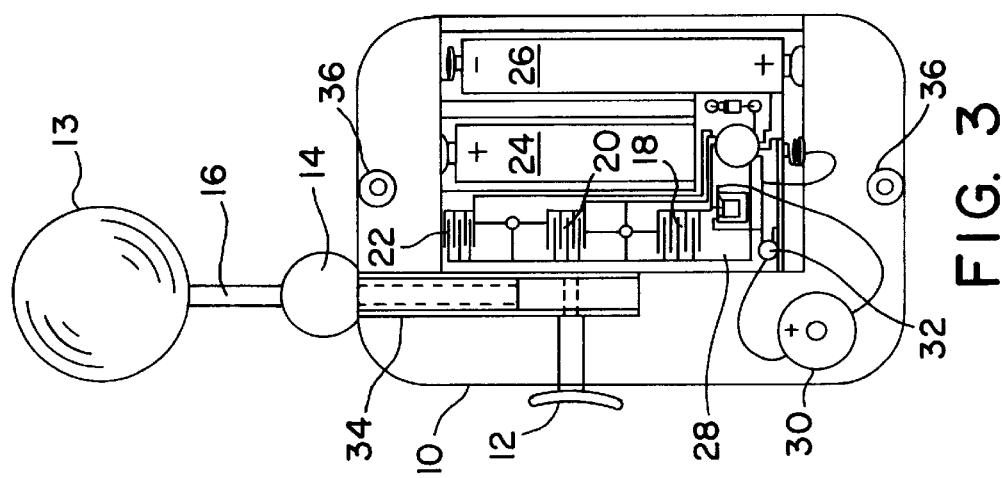
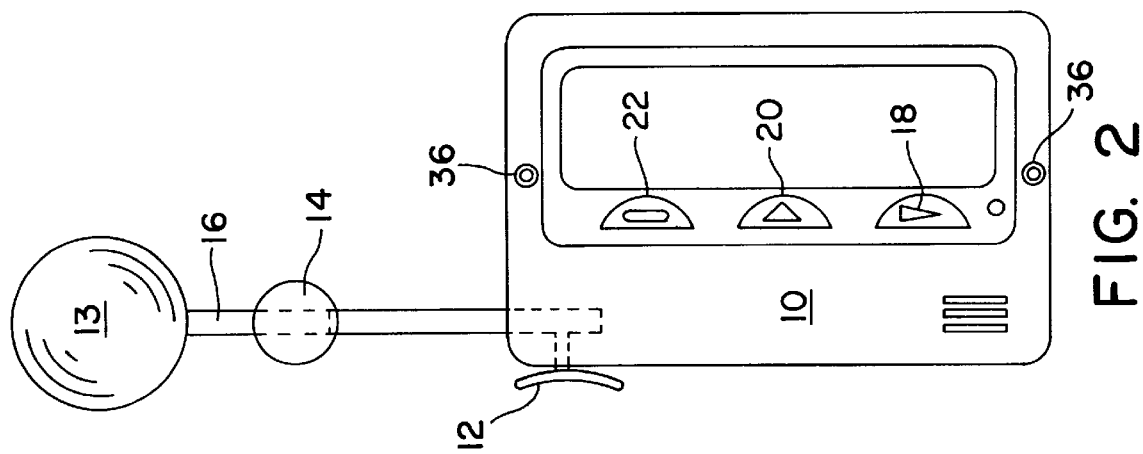
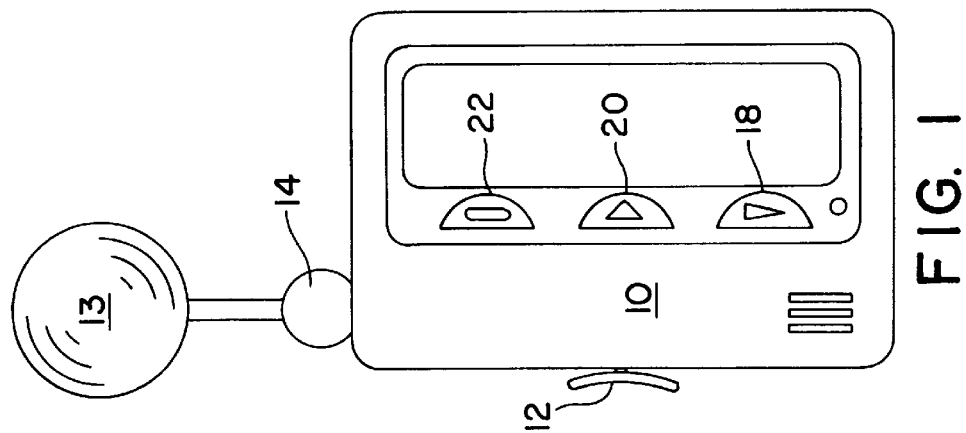

PAGER POPPER

BACKGROUND OF THE INVENTION

This invention is directed to a candy holding device that combines candy and sounds into an amusing, useful device similar to a pager.

PRIOR ART

Heretofore the inventors have patented candy holding devices which are in a combination of a candy holding device with means for playing different types of music. Such a device has been set forth U.S. Pat. No. 5,471,373. Other prior art patents are U.S. Pat. Nos. 2,379,981; 2,590,476; and 5,681,200.

OBJECTS AND ADVANTAGES

It is an object of the present invention to provide realistic pager sounds simultaneously with consumption of a lollipop.

Another object is to be able to provide different realistic pager sounds while consuming a lollipop.

Still another object is to provide a movable sucker holder by which a sucker can be raised which would be similar to raising an antenna on the pager.

Yet another object is to provide a toy similar to a pager by which the candy lollipop can be lowered into a cavity of the pager and can be raised similar to an antenna.

An advantage of the toy pager is to provide pager sounds while consuming a candy lollipop.

Other objects, features and advantages of the invention will become obvious to those skilled in the art from a review of the specification and drawings.

BRIEF DESCRIPTION OF THE DRAWINGS

FIG. 1 illustrates a front view of the pager with a candy lollipop in a lower position;

FIG. 2 illustrates the pager of FIG. 1 with the lollipop in a raised position;

FIG. 3 is a view that illustrates the various operative parts of the pager;

DETAILED DESCRIPTION

Figure 6:
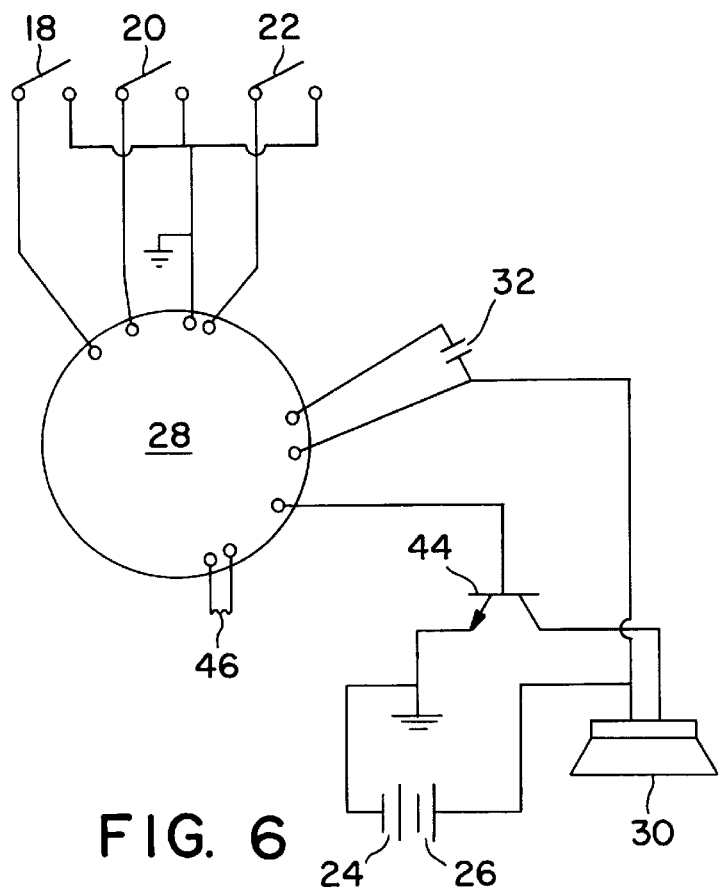
FIG. 6 illustrates a schematic drawing of the electrical circuitry for operation of the pager.

Now referring to the drawings in which the same reference characters represent the same parts throughout the drawings, there is shown a toy pager which can be enjoyed by adults as well as by children. FIGS. 1 and 2 illustrate a front view including a housing 10 which houses the various parts. FIGS. 1 and 2 show a slide button 12 which is secured to a lollipop stick holder 14. The slide button slides along a slit, not shown, for raising and lowering the lollipop 13 secured on a stick 16 which is held by the holder 14, as shown by the dotted lines in FIG. 2. FIG. 2 illustrates the lollipop holder in a raised position. FIGS. 1 and 2 further show three pressure switches 18, 20, 22 which activate different sound circuits for three different pager sounds.

FIG. 3 illustrates the various parts of the electrical circuitry which includes a power supply such as batteries 24, 26, an integrated circuit 18, the three switches 18, 20, 22 which activate the integrated circuit, a speaker 30, a light bulb 32, and the lollipop holder and slide. The lollipop holder operates independently of the sound circuit and can be in an up position or a down position for operation of the sound circuit. In the up position, the lollipop represents a raised antenna. FIG. 3 further illustrates a lollipop holder support tube 34 within the housing and screw receptacles 36 for securing the housing together.

In operation of the play pager, the lollipop holder is moved to an up position or left in the down position. One of the pressure switches is pushed in order to close a circuitry to the integrated circuit which has been programmed with different pager sounds, the speaker, etc. Upon activation of the circuitry, a paging sound will be made via the speaker. By pressing the different switches 18, 20, 22, different paging sounds will be made depending on the program of the integrated circuit. The light bulb 32 is connected to the integrated circuit as an added attraction which will flash as the different sounds are generated.

Figure 4:
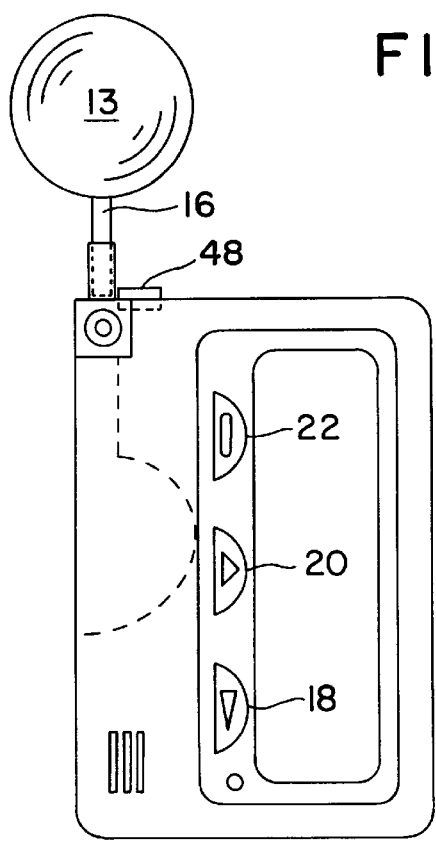
FIG. 4 is a front view of a modification which illustrates a lollipop in a raised position.
Figure 5:
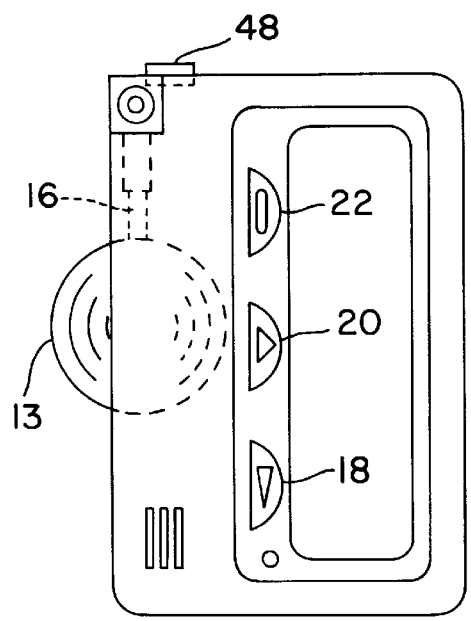
FIG. 5 is a view similar to FIG. 4 with the lollipop rotated partially into the pager body.

FIGS. 4 and 5 illustrate a modification of the pager in which the modification is directed to the lollipop holder. As shown in FIGS. 4 and 5, the lollipop holder 40 is hinged to the housing and can be rotated to partially fit into a receptacle 42 in a side of the housing shown in dotted lines in FIG. 4. The circuitry is the same as for the pager of FIGS. 1–3. In the modification shown by FIGS. 3 and 4, the lollipop can be raised for consumption of the lollipop and for simulating an antenna. A stop 48 is provided in the housing to prevent the lollipop holder from moving too far relative to the housing when in an up position.

FIG. 6 is a schematic drawing for the circuitry which illustrates the batteries 24, 26; the pressure switches 18, 20 22; the integrated circuit 28 the light bulb 32 connected with the integrated circuit; a 8 ohm 0.25 w ½ in. speaker 30 and an output amplifier 44. The circuitry shows the different connections with the integrated circuit and a 100 ohm resistor 46 connected to the integrated circuit.

The housing can be made with at least two pieces which are held together by the screws threaded into the screw receptacles. A door could be added to expose the batteries for replacement, if necessary. The housing can be made of sturdy plastic without any sharp corners or parts to prevent injury of a user. Further, the pager could be provided with a belt clip on the back for securing the pager to one's belt or any other desired part. The lollipop stick can be removed after the lollipop has been consumed and another lollipop on a stick can be secured to the lollipop stick holder.

FIGS. 1, 2, 4, and 5 illustrate slots 50 in the housing. The slots are over the speaker and provide openings through which the sound can pass.

The foregoing relates to preferred exemplary embodiments of the invention, it being understood that other variants and embodiments thereof are possible within the spirit and scope of the invention, the latter being defined by the appended claims.

We claim:

1. A play pager that combines candy and different sounds which comprises a housing, a power source, an integrated circuit programmed to produce a plurality of different pager sounds in sequence, a plurality of switches, one for each of said plurality of different pager sounds connected with said integrated circuit to produce said plurality of different pager sounds, an amplifier for amplifying the plurality of different pager sounds from said integrated circuit, a speaker for producing the plurality of different pager sounds, a lollipop holder secured to said housing for securing a lollipop to said housing, means for moving said lollipop holder from a down position to an up position, and from an up position to a down position and a light bulb connected with said circuitry in which said light bulb flashes as said pager sounds are produced.

2. A play pager as set forth in claim 1, in which said lollipop holder includes means for moving said lollipop holder axially with respect to an axis of said housing from the down position to the up position and from the up position to the down position.

3. A play pager as set forth in claim 1, in which said lollipop holder is hinged to said housing and is rotated on said hinge to the lowered position for storage and is raised to the upper position for consumption of the lollipop.

4. A play pager as set forth in claim 3, in which a stop (48) is provided on said housing to prevent said lollipop from rotating too far in an up position.

\* \* \* \* \*